(12) United States Patent
Branson et al.

(10) Patent No.: US 8,554,757 B2
(45) Date of Patent: Oct. 8, 2013

(54) DETERMINING A SCORE FOR A PRODUCT BASED ON A LOCATION OF THE PRODUCT

(75) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/343,163

(22) Filed: Jan. 4, 2012

(65) Prior Publication Data
US 2013/0173636 A1  Jul. 4, 2013

(51) Int. Cl.
*G06F 17/30* (2006.01)

(52) U.S. Cl.
USPC .......................................... 707/706; 707/748

(58) Field of Classification Search
USPC ................................................. 707/706, 748
See application file for complete search history.

(56) References Cited

U.S. PATENT DOCUMENTS

| | | | |
|---|---|---|---|
| 7,783,620 B1 * | 8/2010 | Chevalier et al. | 707/706 |
| 8,024,326 B2 * | 9/2011 | Tong et al. | 707/721 |
| 8,069,167 B2 * | 11/2011 | Gao et al. | 707/723 |
| 8,131,600 B2 * | 3/2012 | Leggett et al. | 705/26.64 |
| 8,346,624 B2 * | 1/2013 | Goad et al. | 705/26.7 |
| 8,386,355 B1 * | 2/2013 | Kajiwara et al. | 705/36 R |
| 8,392,256 B2 * | 3/2013 | Flombaum et al. | 705/14.42 |
| 2009/0271293 A1 * | 10/2009 | Parkhurst et al. | 705/27 |
| 2010/0319004 A1 | 12/2010 | Hudson et al. | |
| 2011/0022642 A1 | 1/2011 | deMilo et al. | |
| 2012/0123953 A1 * | 5/2012 | Jabara | 705/317 |

OTHER PUBLICATIONS

Jonathan Rouzaud-Cornabas, A Trust Aware Distributed and Collaborative Scheduler for Virtual Machines in Cloud, May 11, 2011, pp. 1-34.

* cited by examiner

*Primary Examiner* — Kim Nguyen
(74) *Attorney, Agent, or Firm* — Owen J. Gamon

(57) ABSTRACT

A method, computer-readable storage medium, and computer system are provided. In an embodiment, a request is received from a requestor. The request specifies a search term and a plurality of weights of a plurality of criteria. A plurality of products are found that satisfy the search term. A plurality of locations where the plurality of products are located are determined. A plurality of scores of the plurality of locations are calculated based on the plurality of weights of the plurality of criteria and a plurality of ratings of the plurality of criteria at the plurality of locations. A best product of the plurality of products located at a best location with a best score of the plurality of scores is selected. In an embodiment, a supplier of the product that is not selected as the best product is notified of the score.

19 Claims, 7 Drawing Sheets

RATING DATA ⟨152⟩

| | | CRITERIA ID | | | |
|---|---|---|---|---|---|
| | | CRITERIA A | CRITERIA B | CRITERIA C | CRITERIA D |
| LOCATION ID | LOCATION A | 0 | 8 | 2 | 4 |
| | LOCATION B | 5 | 1 | 3 | 2 |
| | LOCATION C | 10 | 5 | 6 | 2 |

FIG. 3

LOCATION DATA ⟨154⟩

| PRODUCT ID ⟨420⟩ | LOCATION ID ⟨422⟩ | VERIFICATION LEVEL ⟨424⟩ |
|---|---|---|
| SERVER A | LOCATION A | IP ADDRESS |
| SERVER B | LOCATION B | GPS |
| SERVER C | LOCATION C | PING |
| SERVER D | LOCATION C | CERTIFICATE |
| SERVER E | LOCATION C | INVENTORY |
| APP A | LOCATION A | CERTIFICATE |
| PAGES B | LOCATION B | INVENTORY |

FIG. 4

156
REQUESTOR PROFILES

| USER ID (510) | CRITERIA A (512) | CRITERIA B (514) | CRITERIA C (516) | CRITERIA D (518) | MIN SCORE (520) | VERIFY MIN (522) | |
|---|---|---|---|---|---|---|---|
| USER A | 1 | 7 | 3 | 5 | 15 | GPS | 502 |
| USER B | 6 | 2 | 4 | 3 | 22 | PING | 504 |
| USER C | 9 | 4 | 5 | 1 | 32 | IP | 506 |

FIG. 5

162
SCORE DATA

| USER ID (610) | REQUEST ID (612) | SERVER ID (614) | SCORE (616) | |
|---|---|---|---|---|
| USER A | REQUEST A | SERVER A | 3 | 602 |
| USER A | REQUEST B | SERVER B | 4 | 604 |
| USER B | REQUEST C | SERVER C | 5 | 606 |

FIG. 6

DETERMINING A SCORE FOR A PRODUCT BASED ON A LOCATION OF THE PRODUCT

FIELD

An embodiment of the invention generally relates to computer systems and more particularly to computer systems that use cloud computing.

BACKGROUND

Computer systems typically comprise a combination of computer programs and hardware, such as semiconductors, transistors, chips, circuit boards, storage devices, and processors. The computer programs are stored in the storage devices and are executed by the processors.

One use of computer systems is in a technology known as cloud computing, wherein customers buy or rent computing services. In cloud computing, customers may use computing resources, programs, and data via a network. An analogy is often drawn between cloud computing and an electricity grid. Customers can purchase and use electricity without owning the electrical generating plant or the transmission wires and without knowing which company generated the electricity or what fuel the company used to generate the electricity. Similarly, in cloud computing, customers can access programs, computing resources, and data without owning the computer on which the programs and data are stored and executed, without knowing the identity of the company the developed the programs and data, and without knowing the location where the computer that executes the programs and stores the data is located.

SUMMARY

A method, computer-readable storage medium, and computer system are provided. In an embodiment, a request is received from a requestor. The request specifies a search term and a plurality of weights of a plurality of criteria. A plurality of products are found that satisfy the search term. A plurality of locations where the plurality of products are located are determined. A plurality of scores of the plurality of locations are calculated based on the plurality of weights of the plurality of criteria and a plurality of ratings of the plurality of criteria at the plurality of locations. A best product of the plurality of products located at a best location with a best score of the plurality of scores is selected. In an embodiment, a supplier of the product that is not selected as the best product is notified of the score.

BRIEF DESCRIPTION OF THE SEVERAL VIEWS OF THE DRAWINGS

FIG. 3 depicts a block diagram of an example data structure for rating data, according to an embodiment of the invention.

FIG. 4 depicts a block diagram of an example data structure for location data, according to an embodiment of the invention.

FIG. 5 depicts a block diagram of an example data structure for requestor profiles, according to an embodiment of the invention.

FIG. 6 depicts a block diagram of an example data structure for score data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
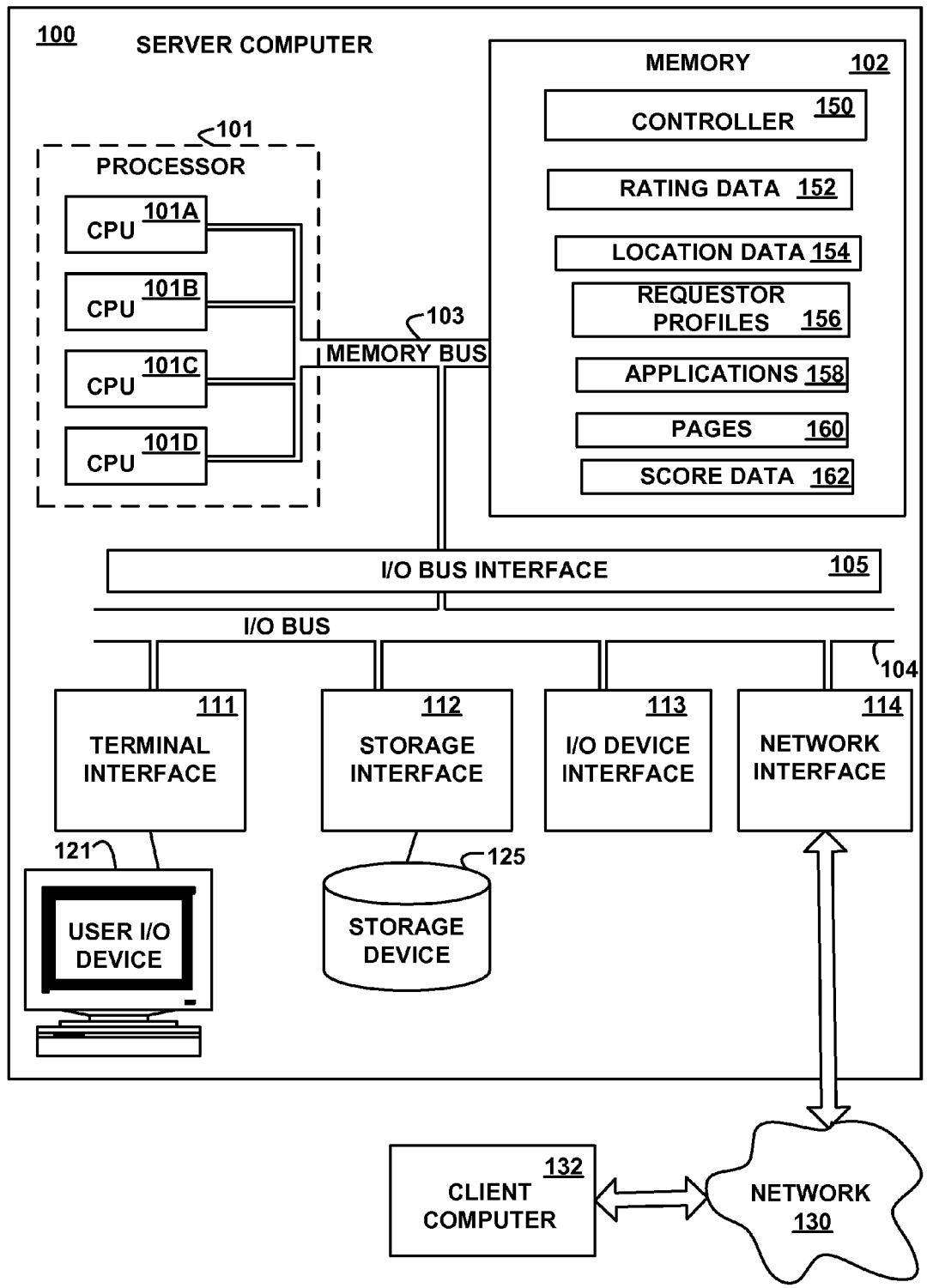
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 150, rating data 152, location data 154, requestor profiles 156, applications 158, pages 160, and score data 162. Although the controller 150, the rating data 152, the location data 154, the requestor profiles 156, the applications 158, the pages 160, and the score data 162 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 150, the rating data 152, the location data 154, the requestor profiles 156, the applications 158, the pages 160, and the score data 162 are illustrated as being contained within the main memory 102, these elements are not necessarily all completely contained in the same storage device at the same time. Further, although the controller 150, the rating data 152, the location data 154, the requestor profiles 156, the applications 158, the pages 160, and the score data 162 are illustrated as being separate entities, in other embodiments some of them, portions of some of them, or all of them may be packaged together.

In an embodiment, the controller 150 and/or the applications 158 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In another embodiment, the controller 150 and/or the application 158 are implemented in hardware via semiconductor devices, chips, logical gates, circuits, circuit cards, and/or other physical hardware devices in lieu of, or in addition to, a processor-based system. In an embodiment, the controller 150 and/or the applications 158 comprise data in addition to instructions or statements. In various embodiments, the applications 158 are user applications, third-party applications, operating systems, or any portion, multiple, or combination thereof. In various embodiments, the pages 160 comprise data, formatting tags, instructions, and/or statements. The computer system 100, the applications 158, and the pages 160 are referred to herein as products.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100. In various embodiments, some or all of the functions of the controller 150 are stored in memory of the client computer system 132 and execute on a processor of the client computer system 132, which may or may not be in the cloud of the server computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
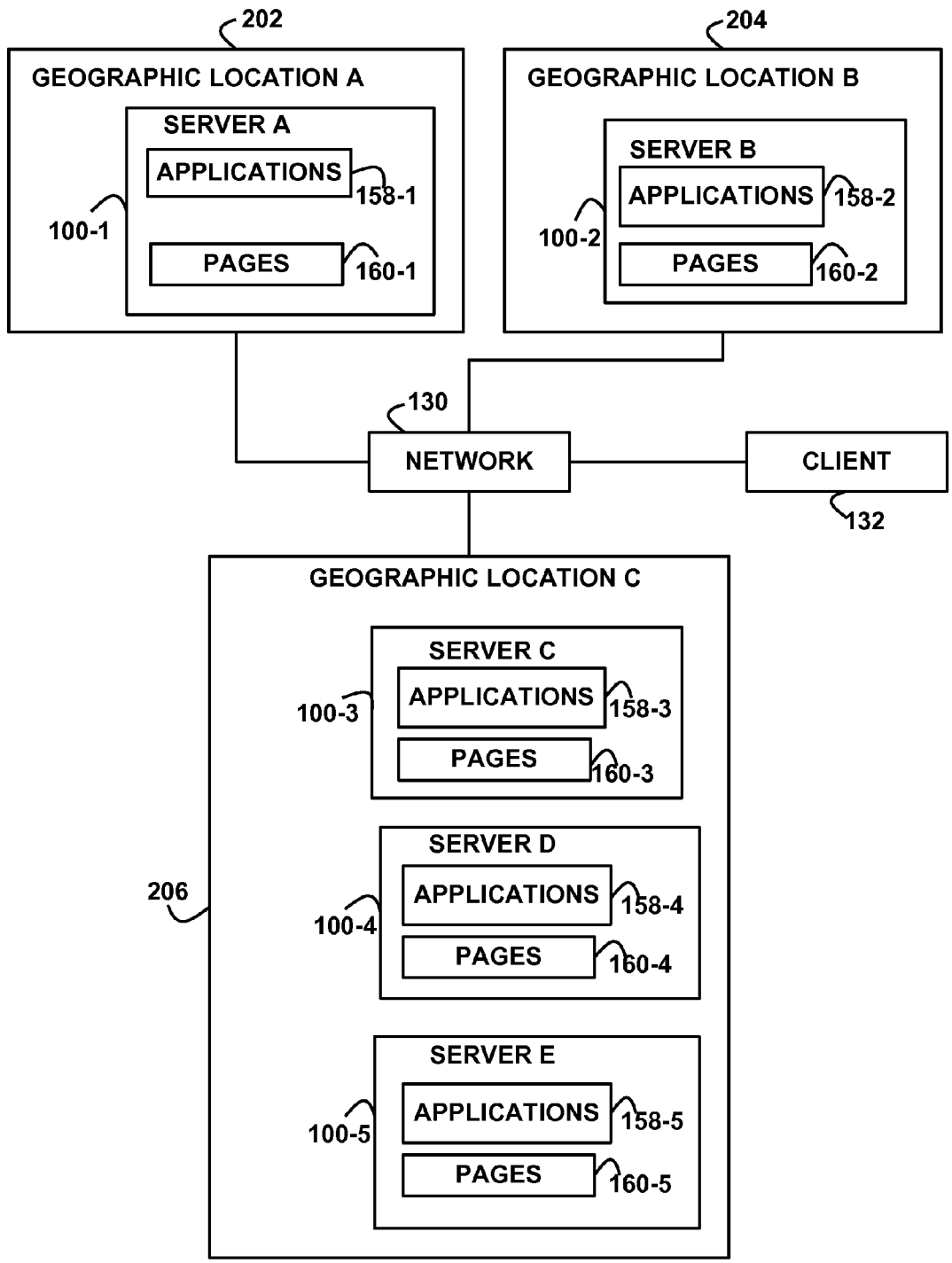
FIG. 2 depicts a block diagram of an example network of server computers at locations connected to a client computer via a network, according to an embodiment of the invention.

FIG. 2 depicts a block diagram of an example network of server computers 100-1, 100-2, 100-3, 100-4, and 100-5 located at respective geographic locations 202, 204, and 206, interconnected via a network 130, and connected to a client computer 132 via the network 130, according to an embodiment of the invention. The servers 100-1, 100-2, 100-3, 100-4, and 100-5 are examples of, and are generically referred to by, the server computer system 100 (FIG. 1). Each of the servers 100-1, 100-2, 100-3, 100-4, and 100-5 may comprise the same or different hardware components and the same or different rating data 152, location data 154, requestor profiles 156, applications 158, pages 160, and score data 162. In various embodiments, some or all of the example server computers 100-1, 100-2, 100-3, 100-4, and 100-5 are in the same or different cloud computing environments. In various embodiments, the client computer 132 is in the same or a different cloud computing environment from some or all of the server computers 100-1, 100-2, 100-3, 100-4, and 100-5. In an embodiment, client computer 132 is not in a cloud computing environment.

The server A 100-1 at the location A 202 comprises applications 158-1 and pages 160-1. The server B 100-2 at the location B 204 comprises applications 158-2 and pages 160-2. The server C at the location C 206 comprises applications 158-3 and pages 160-3. The server D 100-4 at the location C 206 comprises applications 158-4 and pages 160-4. The server E 100-5 at the location C 206 comprises applications 158-5 and pages 160-5. The applications 158-1, 158-2, 158-3, 158-4, and 158-5 are examples of, and are generically referred to by, the applications 158 (FIG. 1). The pages 160-1, 160-2, 160-3, 160-4, and 160-5 are examples of, and are generically referred to by, the pages 160 (FIG. 1). In various embodiments, the geographic locations 202, 204, and 206 may be logical locations, such as companies or organizations, or physical locations, such as zip codes, streets, street addresses, cities, counties, states, provinces, regions, countries, or any combination thereof.

FIG. 3 depicts a block diagram of an example data structure for rating data 152, according to an embodiment of the invention. The example rating data 152 comprises example rows of location IDs (identifiers) and columns of criteria IDs (identifiers). The intersection of the rows and columns are cells, which specify the rating of the criteria identified by the criteria identifiers at the locations specified by the location identifiers. In various embodiments, the controller 150 receives the ratings from an administrator via the user I/O device 121, from one or more of the applications 158, or from the client computer 132 via the network 130 and stores the ratings to the rating data 152 in the memory 102.

The ratings comprises a ranking of the criteria at each location. A criteria is an attribute, external to the product located at the location or originating from the location, that characterizes or describes the location, the environment of the location, or the company that produces the product. The criteria do not describe the product. Examples of criteria include, but are not limited to, the average annual rainfall of the location, the percentage of the location's GNP (Gross National Product) spent on a specified item (e.g., health care or education), the literacy rate of the population at the location, the percentage of electrical power generated or consumed at the location by a specified type of fuel, the labor practices of the company at the location that produces the product, the type of government of the location, or any other appropriate criteria of the location.

In various embodiments, the ratings reflect objective measurements or subject opinions of the person or organization that assigns the ratings to the criteria. In various embodiments, the ratings are absolute, scaled within a range, or relative to the ratings of the same criteria at other locations.

FIG. 4 depicts a block diagram of an example data structure for location data 154, according to an embodiment of the invention. The location data 154 comprises example entries, each of which comprises an example product ID (identifier) 420, location ID (identifier) 422, and verification level 424. The product identifier 420, in each entry, identifies one of the products, such as the server 100-1, 100-2, 100-3, 100-4, or 100-5, the application 158-1 or the pages 160-2. The location identifier 422, in each entry, identifies one of the locations, such as the locations 202, 204, or 206, in which the product identified by the product identifier 420, in the same entry, is physically located or situated. The verification level 424, in each entry, identifies a type of verification that the controller 150, other program, person, or organization performed to verify or certify that the product identified by the product identifier 420, in the same entry, is actually located at the location identified by the location identifier 422, in the same entry. An example of the verification level is the network address (e.g., the IP or Internet Protocol address) of the server, where different network addresses are assigned to different locations. Other examples of the verification level include a verification of location by GPS (Global Positioning Signal), verification of a location by a ping message sent to the server and a response received from the server, a certificate issued by a neutral or impartial third party certifying that the serer exists at the location, or a physical inventory or inspection performed by a neutral or impartial person or organization that verified that the server is located at the location.

FIG. 5 depicts a block diagram of an example data structure for the requestor profiles 156, according to an embodiment of the invention. The controller 150 receives the requestor profiles 156 from the user I/O device 121, the applications 158, or the network 130 (FIG. 1).

The requestor profiles 156 comprise example entries 502, 504, and 506, each of which comprises an example user identifier 510, example criteria 512, 514, 516, and 518, an example minimum score 520, and an example verification minimum field 522. The user identifier 510 identifies a requestor, a user, or a client computer 132 that sends requests to the controller 150. The criteria 512, 514, 516, and 518, in each entry, specify weights that represent the importance that each user (identified by the respective user identifier 510 in the same entry) places on the respective criteria 512, 514, 516, and 518.

In an embodiment, a weight of "0" specifies that the criteria is banned, i.e., the user specifies that a product at a location that has a rating of "0" for that criteria or that has the lowest or worst rating for that criteria, as compared to other locations is not to be selected by the controller for performing the request. In embodiment, a weight of "10" indicates a required criteria, i.e., a selected location must have a rating of "10" or must have the best rating, as compared to other locations, in order for the controller to select a product at the location for performing the request. In other embodiments, any appropriate designation for banned and required criteria may be used. The min (minimum) score 520 specifies the minimum, lowest, or worst score that the user, identified by the user identifier 510 in the same entry, desires for a location selected by the controller 150 for performing requests issued by the user. The verify (verification) minimum 522 specifies a minimum verification level that the user, identified by the user identifier 510 in the same entry, desires for a location selected by the controller 150 for performing requests issued by the user.

FIG. 6 depicts a block diagram of an example data structure for score data 162, according to an embodiment of the invention. The score data 162 comprises example entries 602, 604, and 606, each of which comprises an example user identifier 610, a request ID (identifier) 612, a server ID (identifier) 614, and a score 616. The user identifier 610 identifies a requestor, a user, or a client computer 132 that sends requests to the controller 150. The request identifier 612 identifies a request that the user identified by the user identifier 610, in the same entry, previously sent to the controller 150. In an embodiment, a request specifies, comprises, or identifies an entry in the requestor profile 156 of the requesting user. In an embodiment, a request may specify a search term that specifies an application 158 and request that the application 158 be executed on a server. In an embodiment a request may specify a search term that specifies an address of a page 160 and request that the page 160 be returned to the requesting user or stored on a server 100. In an embodiment, a request may specify a search term and request that a page 160 that comprises a keyword that satisfies, meets, or matches the search term be returned or sent to the requesting user.

Figure 7:
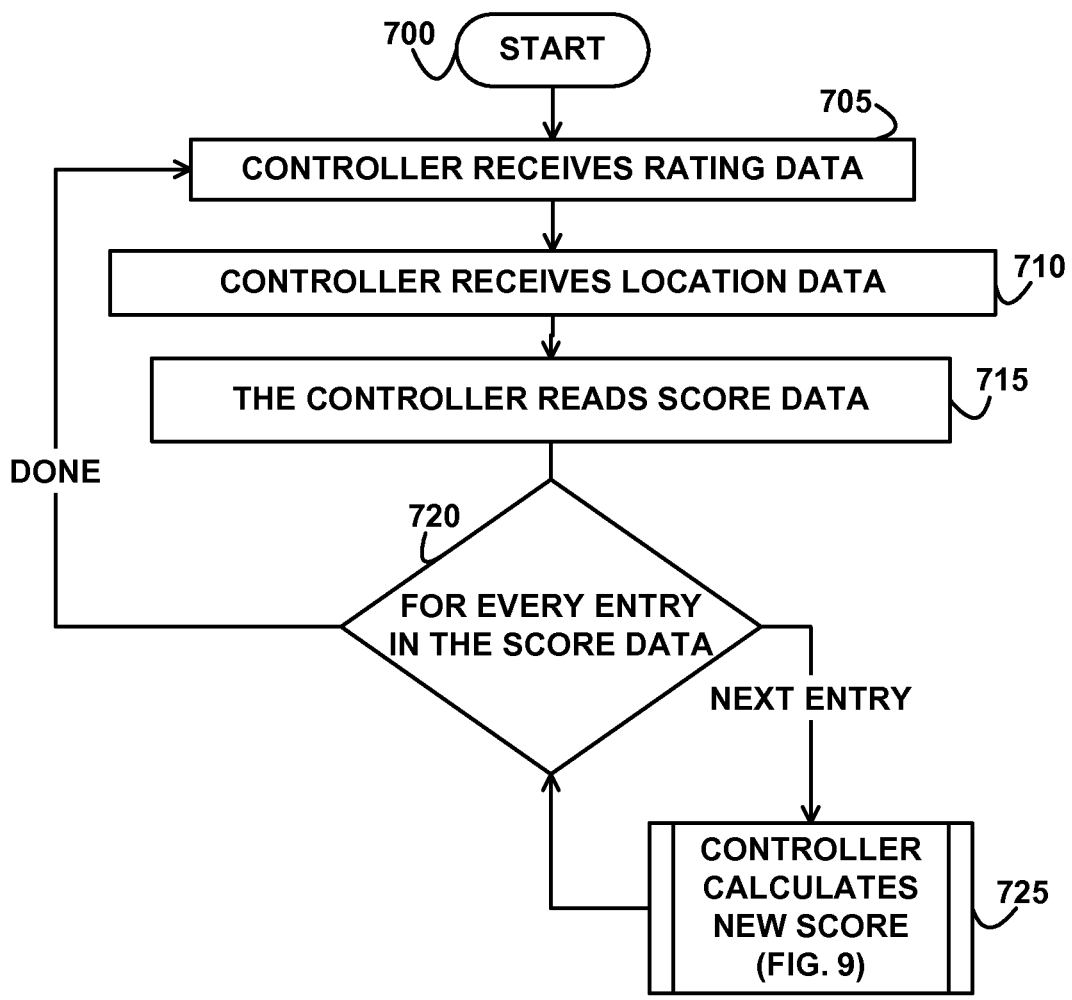
FIG. 7 depicts a flowchart of example processing for receiving rating data and location data and calculating new scores, according to an embodiment of the invention.

FIG. 7 depicts a flowchart of example processing for receiving rating data and location data and calculating new scores, according to an embodiment of the invention. Control begins at block 700. Control then continues to block 705 where the controller 150 receives the rating data 152 from the applications 158, from the user I/O device 121, or from the network 130 and stores the rating data 152 to the memory 102.

Control then continues to block 710 where the controller 150 receives the location data 154 from the applications 158, from the user I/O device 121, or from the network 130 and stores the location data 154 to the memory 102. Control then continues to block 715 where the controller 150 reads the score data 162. Control then continues to block 720 where the controller 150 enters a loop executed for every entry in the score data 162. So long as an entry exists that is unprocessed by the loop that starts at block 720, control continues to block 725 where controller 150 calculates a new score for the location of the product of the request identified by the request identifier 612 of the next unprocessed entry in the score data 162, as further described below with reference to FIG. 9. Control then returns to block 720 where the controller 150 again determines whether every entry in the score data 162 has been processed by the loop.

Once all entries in the score data 162 have been processed by the loop that begins at block 720, control returns from block 720 to block 705, as previously described above. In this way, an embodiment of the invention monitors changes to the environment and updates scores based on the changes continuously, somewhat continuously, periodically, intermittently, or in response to the changes.

Figure 8:
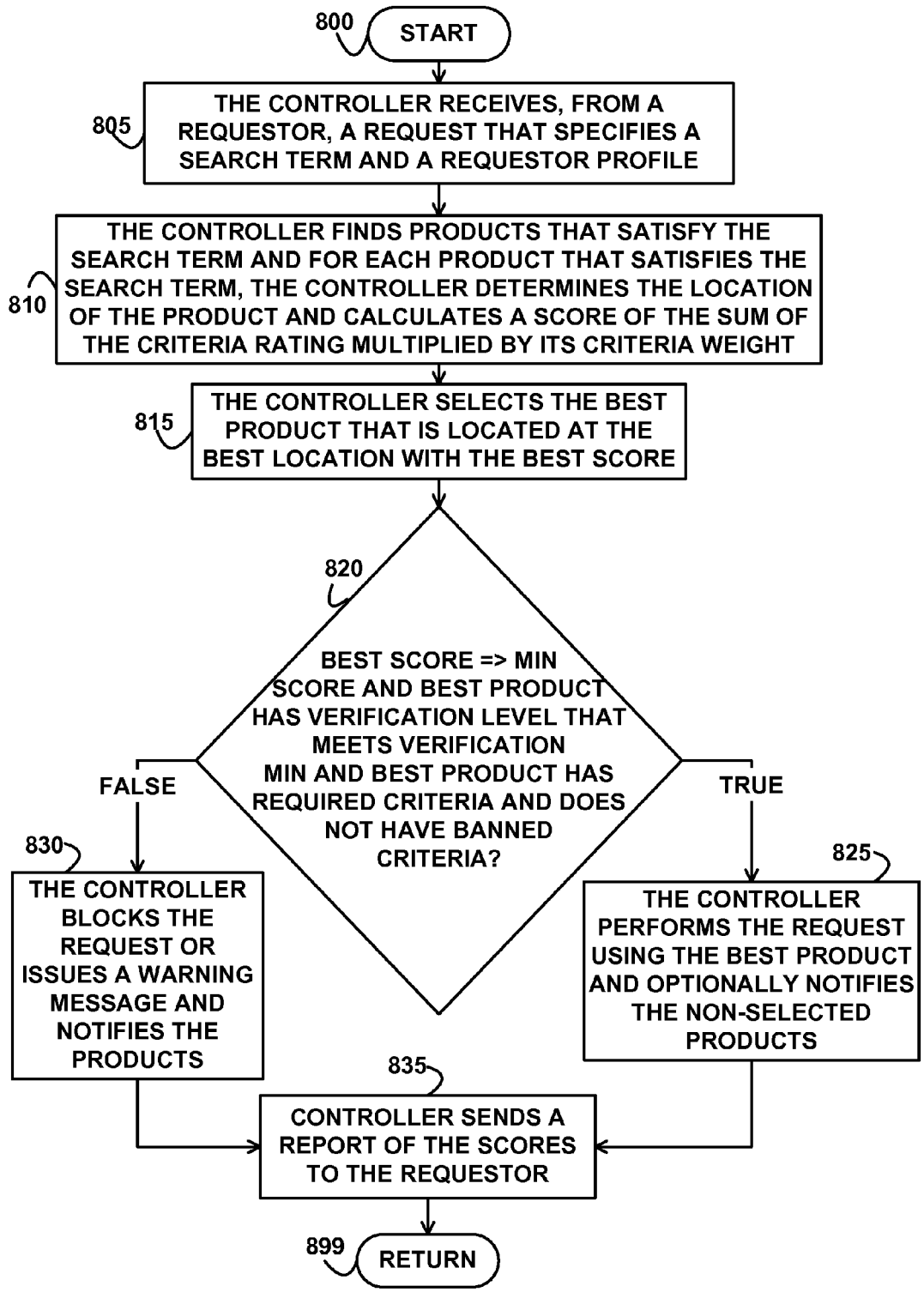
FIG. 8 depicts a flowchart of example processing for selecting a product with the best score, according to an embodiment of the invention.

FIG. 8 depicts a flowchart of example processing for selecting a product with the best score, according to an embodiment of the invention. Control begins at block 800. Control then continues to block 805 where the controller 150 receives, from a requestor, a request that specifies a search term and a requestor profile. The controller 150 stores the received requestor profile to an entry in the requestor profiles 156. Control then continues to block 810 where the controller 150 finds products that satisfy the search term and, for each product that satisfies the search term, the controller 150 determines the location of the product and calculates a score of the sum of the criteria rating multiplied by its criteria weight. In various embodiments, finding products that satisfy the search term comprise finding an application 158 with a type specified by the search term, finding a page 160 with an address specified by the search term, finding a page 160 that comprises a keyword that matches the search term, or finding a server (e.g., the server 10001, 100-2, 100-3, 100-4, or 100-5) capable of executing an application 158 specified by the search term. The controller 150 determines the location of the product by finding a product identifier 420 that matches the identifier of the product and reading the location identifier 422 from the same entry in the location data 154. In various embodiment, a product may be located at multiple locations or may be assembled from components designed or manufactured at multiple locations.

Control then continues to block 815 where the controller 150 selects a best product that is located at the best location with the best score. In an embodiment, the best score is the highest score of all of the locations. In an embodiment, the best score is the lowest score of all of the locations.

Control then continues to block 820 where the controller 150 determines whether the best score is greater than or equal to the minimum score 520 specified by the user that matches the requester, and whether the best product with the best score has a verification level 424 that meets or exceeds the verification minimum 522 specified by the user, and whether the best location of the best product with the best score has the required criteria and does not have banned criteria. If the determination at block 820 is true, then the best score is greater than or equal to the minimum score 520 specified by the user that matches the requester, and the best product at the best location with the best score has a verification level 424 that meets or exceeds the verification minimum 522 specified by the user, and the best product at the best location with the best score has the required criteria and does not have banned criteria specified by the user, so control continues to block 825 where the controller 150 performs the request using the best product at the best location. In an embodiment, performing the request using the best product at the best location comprises sending an application from the best location to the requestor, wherein the best product comprises the application. In an embodiment, performing the request using the best product at the best location comprises executing an application on a best server at the best location, where the search term specifies the application and best product comprises the best server at the best location. In an embodiment, performing the request using the best product at the best location comprises sending a page to the requestor from the best server at the best location, where the product comprises the page that comprises a keyword that satisfies the search term. In an embodiment, the controller 150 notifies the non-selected products (or the suppliers of the non-selected products) of their scores. In an embodiment, in response to the notifications, the suppliers move the non-selected products to other locations with different ratings or take actions to alter the values of the criteria at the locations, which causes the ratings of the criteria to change and which may cause the non-selected product to be selected as the best product with the best score the next time that the controller 150 calculates the scores. Control then continues to block 835 where the controller sends a report of the scores of all of the servers to the requestor. Control then continues to block 899 where the logic of FIG. 8 returns.

If the determination at block 820 is false, then the best score is less than the minimum score 520 specified by the user that matches the requester, or the best product with the best score at the best location has a verification level 424 that is less than or does not meet or match the verification minimum 522 specified by the user, or the best product with the best score at the best location does not have the required criteria or has the banned criteria specified by the user, so control continues to block 830 where the controller 150 blocks the request, refrains from performing the request, or performs the request but sends a warning message to the requestor, indicating that the best product at the best location does not meet the requirements specified by the requestor profile of the requestor. In an embodiment, the controller 150 notifies the products (or the suppliers of the products) of their scores. In an embodiment, in response to the notifications, the suppliers move the products to other locations with different ratings or take actions to alter the values of the criteria at the locations, which causes the ratings of the criteria to change and which may cause the non-selected product to be selected as the best product with the best score the next time that the controller 150 calculates the scores. Control then continues to block 835 where the controller sends a report of the scores of all of the servers to the requestor. Control then continues to block 899 where the logic of FIG. 8 returns.

Figure 9:
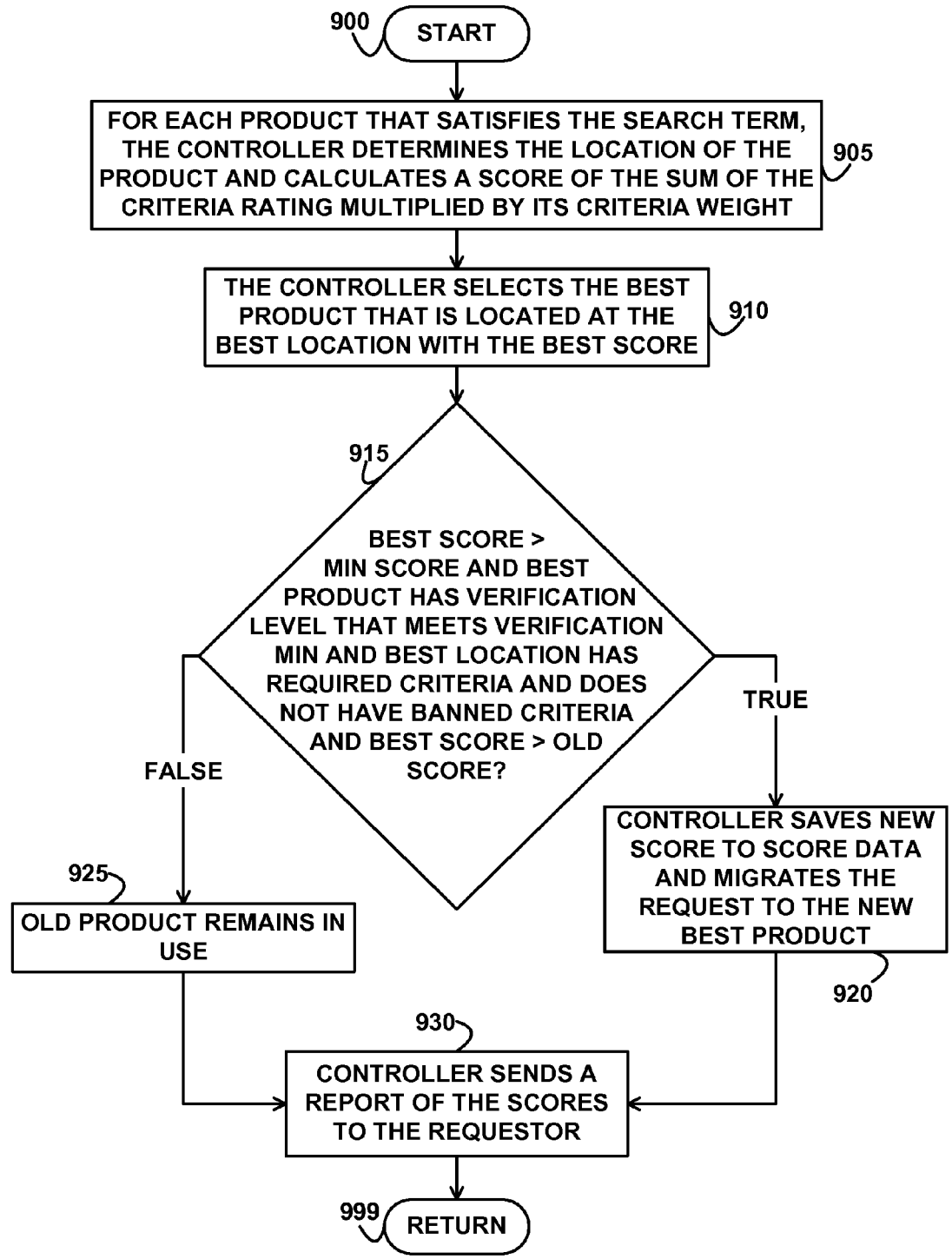
FIG. 9 depicts a flowchart of example processing for calculating new scores, according to an embodiment of the invention.

FIG. 9 depicts a flowchart of example processing for calculating new scores, according to an embodiment of the invention. Control begins at block 900. Control then continues to block 905 where the controller 150, for each product that satisfies the search term of the request, determines the location of the product and calculates a score for the product at the location to be the sum of the criteria rating of the location multiplied by the weight of each criteria, as specified by the requestor profile of the requestor that sent the search term. Control then continues to block 910 where the controller 150 selects the best product that is located at the best location with the best score. Control then continues to block 915 where the controller 150 determines whether the best score is greater than the minimum score specified by the requestor and the best product at the best location has a verification level that meets, matches, or exceeds the verification minimum specified by the requestor and the best location has the required criteria and does not have the banned criteria, and the best score is greater than the old score of the request. The old score is the score the controller previously calculated using previous rating data and/or location data.

If the determination at block 915 is true, then the best score is greater than the minimum score specified by the requestor and the best product at the best location has a verification level that meets the verification minimum specified by the requestor and the best location has the required criteria and does not have the banned criteria, and the best score is greater than the old score of the request, so control continues to block 920 where the controller 150 saves the new best score and the new best product for the request to the score data and migrates the request to the new best product at the best location with the new best score. In an embodiment, migrating the request to the new best product comprises executing an application specified by a search term of the request at the new best product, where the new best product comprises a new best server at the new best location. In an embodiment, migrating the request to the new best product comprises moving a page specified by the request to the new best product, where the new best product comprises a new best server at the new best location with the new best score. In an embodiment, migrating the request to the new best product comprises sending a new page that satisfies the request to the requestor, where the new page is stored at a server located in a new best location with the new best score. Thus, the controller 150 selects a new best product at a new best location in response to a change in the rating data 152 or the location data 154. Control then continues to block 930 where the controller sends a report of the scores of all of the servers to the requestor. Control then continues to block 999 where the logic of FIG. 9 returns.

If the determination at block 915 is false, then the best score is less than or equal to the minimum score specified by the requestor or the best product at the best location has a verification level that does not meet the verification minimum specified by the requestor or the best location does not have the required criteria or does has the banned criteria, or the best score is less than or equal to the old score of the request, so control continues to block 925 where the old product remains in use and the controller does not save the new score to the score data and does not migrate the request. Control then continues to block 930 where the controller sends a report of the scores of all of the servers to the requestor. Control then continues to block 999 where the logic of FIG. 9 returns.

In this way, a user may select the criteria that exist at the locations of the server computers utilized by the user.

In various embodiments, the logic of FIGS. 7, 8, and 9 executes asynchronously, concurrently, or simultaneously on the same or different processors using multi-threading, multi-tasking, or multi-programming techniques.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
receiving a request from a requestor that specifies a search term and a plurality of weights of a plurality of criteria;
finding a plurality of products that satisfy the search term;
determining a plurality of geographical locations where the plurality of products are physically located;
calculating a plurality of scores of the plurality of geographical locations based on the plurality of weights of the plurality of criteria and a plurality of ratings of the plurality of criteria at the plurality of geographical locations, wherein the plurality of criteria describe a plurality of environments of the plurality of geographical locations that are external to the plurality of products;
selecting a best product of the plurality of products physically located at a best geographical location with a best score of the plurality of scores; and
if the best score is better than a minimum score and a verification level of a best geographical location of the best product meets a minimum verification level, wherein the best geographical location is one of the plurality of geographical locations, the best geographical location has required criteria, and the best geographical location does not have banned criteria, performing the request using the best product.

2. The method of claim 1, further comprising: notifying a supplier of one of the plurality of products that was not selected by the selecting, wherein the supplier modifies the criteria of the geographical location of the one of the plurality of products in response to the notifying.

3. The method of claim 1, wherein the search term specifies an application, wherein the best product comprises a best server, and wherein performing the request comprises executing the application on the best server at the best geographical location.

4. The method of claim 1, wherein the product comprises a page that comprises a keyword that satisfies the search term, and wherein performing the request comprises returning the page to the requestor from the best geographical location.

5. The method of claim 1, further comprising: if the best score is not better than the minimum score, refraining from performing the request.

6. The method of claim 1, further comprising: if the verification level of the best geographical location of the best product does not meet the minimum verification level, refraining from performing the request.

7. The method of claim 1, further comprising: if the best geographical location does not have the required criteria, refraining from performing the request.

8. The method of claim 1, further comprising: if the best geographical location has the banned criteria, refraining from performing the request; and sending the plurality of scores to the requestor.

9. A non-transitory computer-readable storage medium encoded with instructions, wherein the instructions when executed comprise:
receiving a request from a requestor that specifies a search term and a plurality of weights of a plurality of criteria;
finding a plurality of products that satisfy the search term;
determining a plurality of geographical locations where the plurality of products are physically located;
calculating a plurality of scores of the plurality of geographical locations based on the plurality of weights of the plurality of criteria and a plurality of ratings of the plurality of criteria at the plurality of geographical locations, wherein the calculating the plurality of scores further comprises calculating a sum of the plurality of weights multiplied by the plurality of ratings, wherein the plurality of criteria describe a plurality of environments of the plurality of geographical locations that are external to the plurality of products;
selecting a best product of the plurality of products physically located at a best geographical location with a best score of the plurality of scores; and
if the best score is better than a minimum score and a verification level of a best geographical location of the best product meets a minimum verification level, wherein the best geographical location is one of the plurality of geographical locations, the best geographical location has required criteria, and the best geographical location does not have banned criteria, performing the request using the best product.

10. The non-transitory computer-readable storage medium of claim 9, further comprising: notifying a supplier of one of the plurality of products that was not selected by the selecting, wherein the supplier modifies the criteria of the geographical location of the one of the plurality of products in response to the notifying.

11. The non-transitory computer-readable storage medium of claim 9, wherein the search term specifies an application, wherein the best product comprises a best server, and wherein performing the request comprises executing the application on the best server at the best geographical location.

12. The non-transitory computer-readable storage medium of claim 9, wherein the product comprises a page that comprises a keyword that satisfies the search term, and wherein performing the request comprises returning the page to the requestor from the best geographical location.

13. The non-transitory computer-readable storage medium of claim 9, further comprising: if the best score is not better than the minimum score, refraining from performing the request.

14. The non-transitory computer-readable storage medium of claim 9, further comprising: if the verification level of the best geographical location of the best product does not meet the minimum verification level, refraining from performing the request; if the best geographical location does not have the required criteria, refraining from performing the request;
if the best geographical location has the banned criteria, refraining from performing the request; and sending the plurality of scores to the requestor.

15. A computer system comprising:
a processor; and
memory communicatively coupled to the processor, wherein the memory is encoded with instructions, wherein the instructions when executed by the processor comprise
receiving a request from a requestor that specifies a search term and a plurality of weights of a plurality of criteria,
finding a plurality of products that satisfy the search term,
determining a plurality of geographical locations where the plurality of products are physically located,
calculating a plurality of scores of the plurality of geographical locations based on the plurality of weights of the plurality of criteria and a plurality of ratings of the plurality of criteria at the plurality of geographical locations, wherein the calculating the plurality of scores further comprises calculating a sum of the plurality of weights multiplied by the plurality of ratings, wherein the plurality of criteria describe a plurality of environments of the plurality of geographical locations that are external to the plurality of products,
selecting a best product of the plurality of products physically located at a best geographical location with a best score of the plurality of scores, and
if the best score is better than a minimum score and a verification level of a best geographical location of the best product meets a minimum verification level, wherein the best geographical location is one of the plurality of geographical locations, the best geographical location has required criteria, and the best geographical location does not have banned criteria, performing the request using the best product.

16. The computer system of claim 15, further comprising: notifying a supplier of one of the plurality of products that was not selected by the selecting, wherein the supplier modifies the criteria of the geographical location of the one of the plurality of products in response to the notifying.

17. The computer system of claim 15, wherein the search term specifies an application, wherein the best product comprises a best server, and wherein performing the request comprises executing the application on the best server at the best geographical location, wherein the instructions further comprise: in response to a change to at least one of the plurality of ratings of the plurality of criteria at the plurality of geographical locations, calculating a new best score, selecting a new best product of the plurality of products physically located at a new best geographical location with the new best score, and executing the application at the new best product.

18. The computer system of claim 15, wherein the product comprises a page that comprises a keyword that satisfies the search term, and wherein performing the request comprises returning the page to the requestor from the best geographical location.

19. The computer system of claim 15, wherein the instructions further comprise:
if the best score is not better than the minimum score, refraining from performing the request;
if the verification level of the best geographical location of the best product does not meet the minimum verification level, refraining from performing the request;
if the best geographical location does not have the required criteria, refraining from performing the request;
if the best geographical location has the banned criteria, refraining from performing the request; and
sending the plurality of scores to the requestor.

* * * * *